(12) United States Patent
Singh

(10) Patent No.: US 8,979,700 B2
(45) Date of Patent: *Mar. 17, 2015

(54) MULTI-SPEED TRANSMISSION

(71) Applicant: GM Global Technology Operations LLC, Detroit, MI (US)

(72) Inventor: Tejinder Singh, Commerce Township, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/166,454

(22) Filed: Jan. 28, 2014

(65) Prior Publication Data
US 2014/0141924 A1 May 22, 2014

Related U.S. Application Data

(63) Continuation of application No. 13/488,017, filed on Jun. 4, 2012, now Pat. No. 8,636,617.

(51) Int. Cl.
*F16H 57/10* (2006.01)
*F16H 3/62* (2006.01)
*F16H 3/66* (2006.01)

(52) U.S. Cl.
CPC .. *F16H 3/62* (2013.01); *F16H 3/66* (2013.01); *F16H 3/666* (2013.01); *F16H 2200/0065* (2013.01); *F16H 2200/2012* (2013.01); *F16H 2200/2048* (2013.01)
USPC ............................................ 475/271

(58) Field of Classification Search
USPC ................... 475/271, 278, 280, 288
See application file for complete search history.

(56) References Cited

U.S. PATENT DOCUMENTS

| | | | |
|---|---|---|---|
| 4,038,888 A | 8/1977 | Murakami et al. | |
| 7,163,484 B2 * | 1/2007 | Klemen | 475/276 |
| 8,079,932 B2 * | 12/2011 | Phillips et al. | 475/280 |
| 8,187,130 B1 | 5/2012 | Mellet et al. | |
| 8,197,375 B1 * | 6/2012 | Hart et al. | 475/275 |
| 8,353,801 B2 * | 1/2013 | Hart et al. | 475/276 |
| 8,409,045 B1 * | 4/2013 | Mellet et al. | 475/280 |
| 8,496,558 B2 * | 7/2013 | Wittkopp et al. | 475/276 |
| 8,556,766 B2 * | 10/2013 | Mellet et al. | 475/276 |
| 8,591,364 B2 * | 11/2013 | Hart | 475/116 |
| 8,632,435 B2 * | 1/2014 | Garcia et al. | 475/278 |
| 8,636,617 B2 * | 1/2014 | Singh | 475/275 |
| 8,702,555 B1 * | 4/2014 | Hart et al. | 475/281 |
| 2007/0129206 A1 | 6/2007 | Jang | |
| 2008/0064556 A1 | 3/2008 | Kamm et al. | |
| 2008/0153655 A1 | 6/2008 | Kawaguchi et al. | |
| 2008/0261764 A1 * | 10/2008 | Hart et al. | 475/276 |
| 2008/0261765 A1 | 10/2008 | Phillips et al. | |
| 2008/0274853 A1 | 11/2008 | Raghavan | |
| 2009/0209387 A1 | 8/2009 | Phillips et al. | |
| 2009/0280947 A1 | 11/2009 | Seo et al. | |
| 2010/0210398 A1 | 8/2010 | Hart et al. | |
| 2011/0111914 A1 * | 5/2011 | Phillips et al. | 475/271 |

(Continued)

*Primary Examiner* — Robert A Siconolfi
*Assistant Examiner* — Huan Le

(57) ABSTRACT

A transmission is provided having an input member, an output member, four planetary gear sets, a plurality of coupling members and a plurality of torque transmitting devices. Each of the planetary gear sets includes first, second and third members. The torque transmitting devices include clutches and brakes actuatable in combinations of two to establish a plurality of forward gear ratios and one reverse gear ratio.

43 Claims, 3 Drawing Sheets

(56) References Cited

U.S. PATENT DOCUMENTS

| | | |
|---|---|---|
| 2011/0111915 A1* | 5/2011 | Hart et al. .................... 475/271 |
| 2011/0136615 A1* | 6/2011 | Phillips et al. ................ 475/282 |
| 2011/0275473 A1 | 11/2011 | Phillips et al. |
| 2012/0202638 A1 | 8/2012 | Phillips et al. |
| 2012/0214635 A1* | 8/2012 | Mellet et al. ................. 475/276 |
| 2013/0190127 A1* | 7/2013 | Singh ........................... 475/276 |
| 2013/0203547 A1* | 8/2013 | Singh ........................... 475/276 |
| 2013/0231215 A1* | 9/2013 | Coffey et al. ................. 475/276 |
| 2013/0237365 A1* | 9/2013 | Coffey et al. ................. 475/276 |
| 2013/0260942 A1* | 10/2013 | Garcia et al. ................. 475/205 |
| 2013/0281246 A1* | 10/2013 | Neelakantan et al. ........ 475/120 |
| 2013/0324346 A1* | 12/2013 | Garcia et al. ................. 475/205 |

\* cited by examiner

| GEAR STATE | GEAR RATIO | RATIO STEP | CLUTCHING ELEMENTS ||||||| 
|---|---|---|---|---|---|---|---|---|---|
| | | | 34 | 30 | 36 | 32 | 26 | 24 | 28 |
| REV | -3.140 | | X | | | | | X | |
| N | | -0.73 | | | | | | | |
| 1ST | 4.302 | | X | | X | | | | |
| 2ND | 2.964 | 1.45 | | | X | X | | | |
| 3RD | 2.656 | 1.12 | | X | X | | | | |
| 4TH | 2.132 | 1.25 | | | X | | | | X |
| 5TH | 1.743 | 1.22 | | | X | | | X | |
| 6TH | 1.357 | 1.28 | | | X | | X | | |
| 7TH | 1.000 | 1.36 | | | | | X | X | |
| 8TH | 0.758 | 1.32 | | X | | | X | | |
| 9TH | 0.617 | 1.23 | | | | X | X | | |

X = ON - ENGAGED CARRYING TORQUE
O = ON - ENGAGED NOT CARRYING TORQUE

| GEAR STATE | GEAR RATIO | RATIO STEP | CLUTCHING ELEMENTS | | | | | | |
|---|---|---|---|---|---|---|---|---|---|
| | | | 36 | 32' | 34' | 24' | 26 | 30' | 28' |
| REV | -4.160 | | | | | X | X | | |
| N | | -0.78 | | | | | | | |
| 1ST | 5.352 | | X | | | X | | | |
| 2ND | 3.690 | 1.45 | X | X | | | | | |
| 3RD | 3.175 | 1.16 | X | | | | | X | |
| 4TH | 2.652 | 1.20 | X | | | | | | X |
| 5TH | 2.084 | 1.27 | X | | | | X | | |
| 6TH | 1.446 | 1.44 | X | | | | | X | |
| 7TH | 1.000 | 1.45 | | | | X | X | | |
| 8TH | 0.806 | 1.24 | | | | | | X | X |
| 9TH | 0.615 | 1.31 | | X | | | | X | |

X = ON - ENGAGED CARRYING TORQUE
O = ON - ENGAGED NOT CARRYING TORQUE

MULTI-SPEED TRANSMISSION

CROSS-REFERENCE TO RELATED APPLICATIONS

This continuation application claims the benefit of U.S. application Ser. No. 13/488,017 filed on Jun. 4, 2012, which claims the benefit of Provisional Application No. 61/602,846, filed Feb. 24, 2012. The entire contents of the above applications are incorporated herein by reference.

FIELD

The invention relates generally to a multiple speed transmission having a plurality of planetary gear sets and a plurality of torque transmitting devices and more particularly to a transmission having nine speeds, four planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches and brakes.

In another embodiment of the present invention, a transmission is provided having an input member, an output member, first, second, third and fourth planetary gear sets each having a sun gear, a carrier member and a ring gear. The output member is continuously interconnected with the carrier member of the first planetary gear set, the ring gear of the third planetary gear set and the ring gear of the fourth planetary gear set.

In yet another embodiment of the present invention, a first interconnecting member continuously interconnects the ring gear of the first planetary gear set with the carrier member of the second planetary gear set.

In yet another embodiment of the present invention, a second interconnecting member continuously interconnects the carrier member of the first planetary gear set with the ring gear of the third planetary gear set and the ring gear of the fourth planetary gear set.

In yet another embodiment of the present invention, a third interconnecting member continuously interconnects the ring gear of the second planetary gear set with the carrier member of the third planetary gear set.

In yet another embodiment of the present invention, a fourth interconnecting member continuously interconnects the carrier member of the third planetary gear set with the carrier member of the fourth planetary gear set.

In yet another embodiment of the present invention, a first torque transmitting device is selectively engageable to interconnect the sun gear of the third planetary gear set with the input member.

In yet another embodiment of the present invention, a second torque transmitting device is selectively engageable to interconnect the ring gear of the second planetary gear set and the carrier member of the third planetary gear set with the sun gear of the second planetary gear set and the input member.

In yet another embodiment of the present invention, a third torque transmitting device is selectively engageable to interconnect the carrier member of the fourth planetary gear set with the ring gear of the fourth planetary gear set.

In yet another embodiment of the present invention, a fourth torque transmitting device is selectively engageable to interconnect the sun gear of the third planetary gear set with the stationary member.

In yet another embodiment of the present invention, a fifth torque transmitting device is selectively engageable to interconnect the sun gear of the fourth planetary gear set with the stationary member.

In yet another embodiment of the present invention, a sixth torque transmitting device is selectively engageable to interconnect the carrier member of the fourth planetary gear set with the stationary member.

In yet another embodiment of the present invention, a seventh torque transmitting device is selectively engageable to interconnect the sun gear of the first planetary gear set with the stationary member.

In yet another embodiment of the present invention, the torque transmitting devices are each selectively engageable in combinations of at least two to establish a plurality of forward speed ratios and at least one reverse speed ratio between the input member and the output member.

In still another embodiment of the present invention, a transmission is provided that has an input member, an output member, first, second, third and fourth planetary gear sets each having first, second and third members. The output member is continuously interconnected the second member of the first planetary gear set and the third member of the third planetary gear set. A first interconnecting member continuously interconnects the first member of the first planetary gear set with the second member of the second planetary gear set. A second interconnecting member continuously interconnects the second member of the first planetary gear set with the third member of the third planetary gear set. A third interconnecting member continuously interconnects the third member of the second planetary gear set with the second member of the third planetary gear set. A fourth interconnecting member continuously interconnects the second member of the third planetary gear set with the third member of the fourth planetary gear set. A first torque transmitting device is selectively engageable to interconnect the first member of the fourth planetary gear set with the first member of the second planetary gear set and the input member. A second torque transmitting device is selectively engageable to interconnect the third member of the second planetary gear set and the second member of the third planetary gear set with the first member of the second planetary gear set and the input member. A third torque transmitting device is selectively engageable to interconnect the third member of the fourth planetary gear set and the second member of the third planetary gear set with the second member of the first planetary gear set, the output member and the third member of the third planetary gear set. A fourth torque transmitting device is selectively engageable to interconnect the first member of the fourth planetary gear set with the stationary member. A fifth torque transmitting device is selectively engageable to interconnect the second member of the fourth planetary gear set with the stationary member. A sixth torque transmitting device is selectively engageable to interconnect the third member of the fourth planetary gear set and the second member of the third planetary gear set with the stationary member. A seventh torque transmitting device is selectively engageable to interconnect the third member of the first planetary gear set with the stationary member. The torque transmitting devices are each selectively engageable in combinations of at least two to establish a plurality of forward speed ratios and at least one reverse speed ratio between the input member and the output member. The third member of the first planetary gear set, the first member of the second planetary gear set, the first member of the third planetary gear set and the first member of the fourth planetary gear set are sun gears, the second member of the first planetary gear set, the second member of the second planetary gear set, the second member of the third planetary gear set and the second member of the fourth planetary gear set are carrier members, the first member of the first planetary gear set, the third member of the second planetary gear set, the third member of the third planetary gear set and the third member of the fourth planetary gear set are ring gears.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

Figure 1:
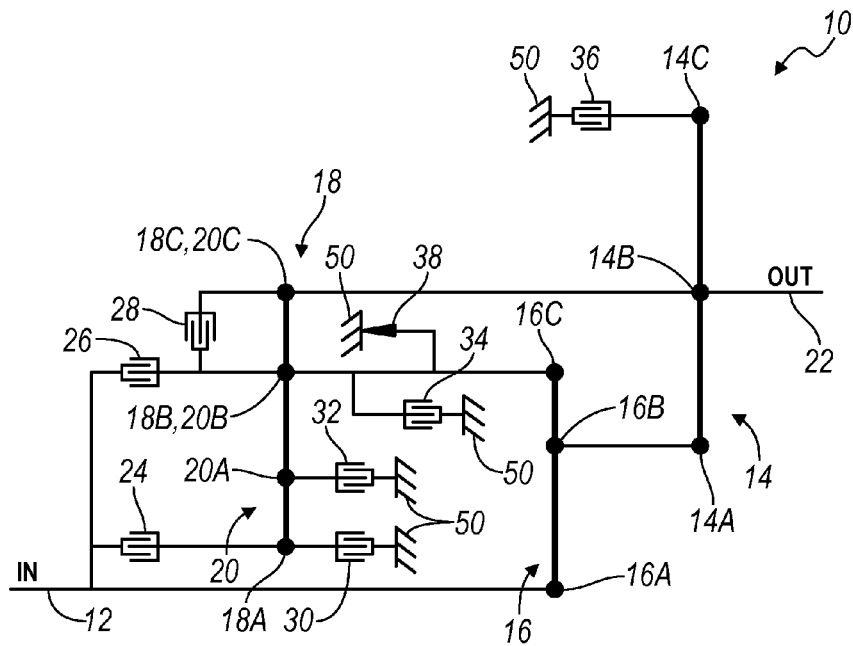
FIG. 1 is a lever diagram of an embodiment of a nine speed transmission according to the present invention.
Figures 3, 4:
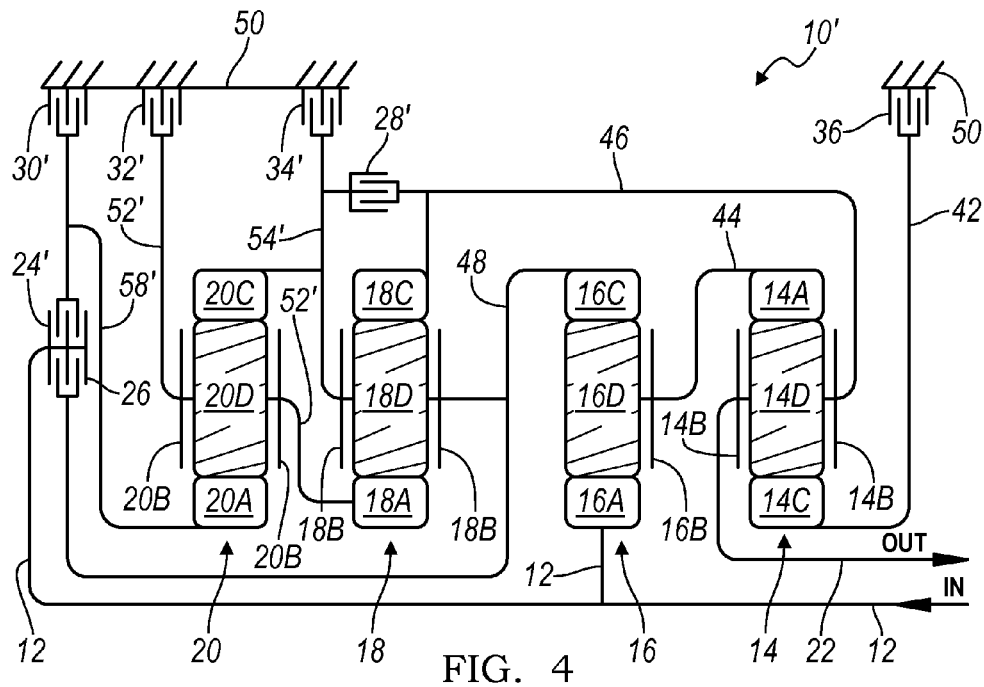
FIG. 3 is a truth table presenting the state of engagement of the various torque transmitting elements in each of the available forward and reverse speeds or gear ratios of the transmissions illustrated in FIGS. 1 and 2.
FIG. 4 is a diagrammatic illustration of another embodiment of a nine speed transmission according to the present invention.
Figures 5, 6:
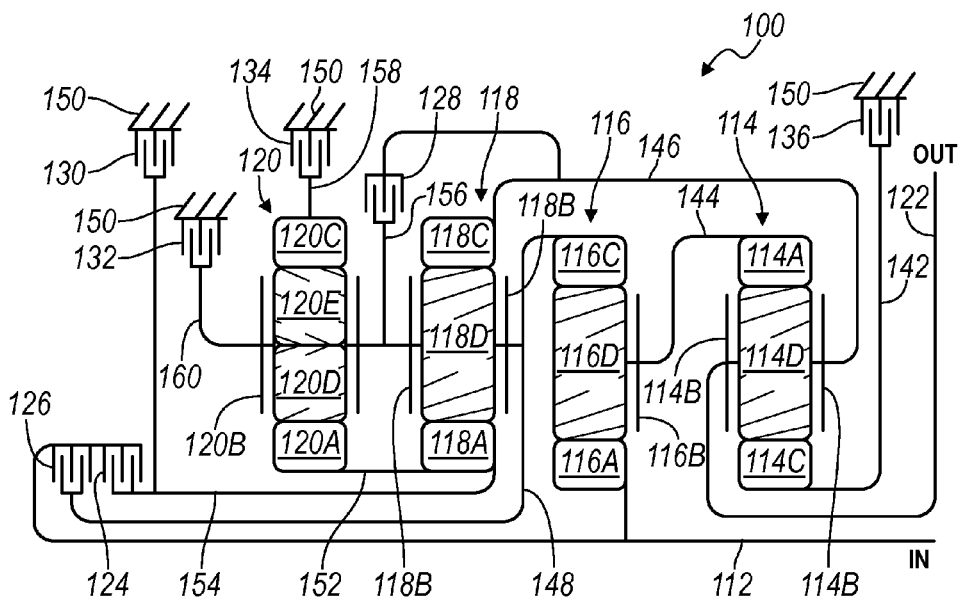

FIG. 5 is another truth table presenting an alternate state of engagement of the various torque transmitting elements in each of the available forward and reverse speeds or gear ratios of the transmissions illustrated in FIGS. 1 and 4; and FIG. 6 is a diagrammatic illustration of another embodiment of a nine speed transmission having a compound planetary gear set, in accordance with the present invention.

DETAILED DESCRIPTION

The following description is merely exemplary in nature and is not intended to limit the present disclosure, application, or uses.

At the outset, it should be appreciated that the embodiments of the multi-speed automatic transmissions of the present invention have an arrangement of permanent mechanical connections between the elements of the four planetary gear sets. For example, a first component or element of a first planetary gear set is permanently coupled to a second component or element of the second planetary gear set. A second component or element of the first planetary gear set is permanently coupled a third component or element of the third planetary gear set and to a third component or element of the fourth planetary gear set. A third component or element of the second planetary gear set is permanently coupled to a second component or element of the third planetary gear set and a second component or element of the fourth planetary gear set. A second component or element of the third planetary gear set is permanently coupled a second component or element of the fourth planetary gear set. A third component or element of the third planetary gear set is permanently coupled a third component or element of the fourth planetary gear set.

Referring now to FIG. 1, an embodiment of a nine speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18 and a fourth planetary gear set 20 and an output shaft or member 22. The first planetary gear set 14 has three nodes: a first node 14A, a second node 14B and a third node 14C. The second planetary gear set 16 has three nodes: a first node 16A, a second node 16B and a third node 16C. In the lever diagram of FIG. 1, the levers for the third planetary gear set 18 and the fourth planetary gear set 20 have been combined into a single four node lever having: a first node 18A, a second node 20A, a third node 18B, 20B, and a fourth node 18C, 20C. Thus, the second member 18B of the third planetary gear set 18 is coupled directly to the second member 20B of the fourth planetary gear set 20 and the third member 18C of the third planetary gear set 18 is coupled directly to the third member 20C of the fourth planetary gear set 20.

The input member 12 is continuously coupled to the first node 16A of the second planetary gear set 16. The output member 22 is coupled to the second node 14B of the first planetary gear set 14 and the fourth node 18C, 20C of the combined levers of the third and fourth planetary gear sets 18, 20. The first node 14A of the first planetary gear set 14 is coupled to the second node 16B of the second planetary gear set 16. The third node 16C of the second planetary gear set 16 is coupled to the third node 18B, 20B of the combined levers of the third and fourth planetary gear sets 18, 20.

A first clutch 24 selectively connects the first node 16A of the second planetary gear set 16 and the input member or shaft 12 with the first node 18A of the combined levers of the third and fourth planetary gear sets 18, 20. A second clutch 26 selectively connects the first node 16A of the second planetary gear set 16 and the input member or shaft 12 with the third node 18B,20B of the combined levers of the third and fourth planetary gear sets 18, 20 and the third node 16C of the second planetary gear set 16. A third clutch 28 selectively connects the third node 18B,20B of the combined levers of the third and fourth planetary gear sets 18, 20 with the fourth node 18C,20C of the combined levers of the third and fourth planetary gear sets 18, 20 and the second node 14B of the first planetary gear set 14. A first brake 30 selectively connects the first node 18A of the combined levers of the third and fourth planetary gear sets 18, 20 with a stationary member or transmission housing 50. A second brake 32 selectively connects the second node 20A of the combined levers of the third and fourth planetary gear sets 18, 20 with a stationary member or transmission housing 50. A third brake 34 selectively connects the third node 18B,20B of the combined levers of the third and fourth planetary gear sets 18, 20 and the third node 16C of the second planetary gear set 16 with the stationary member or transmission housing 50. A fourth brake 36 selectively connects the third node 14C of the first planetary gear set 14 with the stationary member or transmission housing 50. In an alternate embodiment, the present invention contemplates the inclusion of a one-way clutch 38. One-way clutch 38 selectively connects the third node 18B,20B of the combined levers of the third and fourth planetary gear sets 18, 20 and the third node 16C of the second planetary gear set 16 with the stationary member or transmission housing 50.

Figure 2:
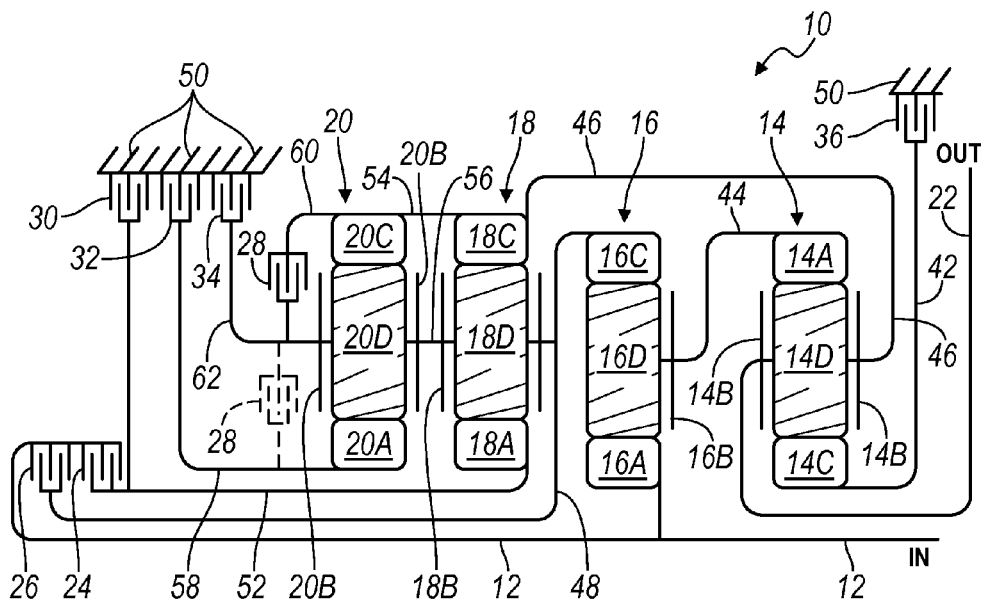
FIG. 2 is a diagrammatic illustration of an embodiment of a nine speed transmission according to the present invention.

Referring now to FIG. 2, a stick diagram presents a schematic layout of an embodiment of the nine speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers. In an embodiment of the present invention, the four planetary gear sets 14, 16, 18 and 20 are simple planetary gear sets, as described below. However, the present invention contemplates other embodiments that replace the simple planetary gear sets with all or a combination of compound planetary gear sets having two or more sets of planet pinions supported by a single carrier member.

For example, the planetary gear set 14 includes a sun gear member 14C, a ring gear member 14A and a planet gear carrier member 14B that rotatably supports a set of planet gears 14D (only one of which is shown). The sun gear member 14C is connected for common rotation with a first shaft or interconnecting member 42. The ring gear member 14A is connected for common rotation with a second shaft or interconnecting member 44. The planet carrier member 14B is connected for common rotation with a third shaft or interconnecting member 46 and the output shaft or member 22. The planet gears 14D are each configured to intermesh with both the sun gear member 14C and the ring gear member 14A.

The planetary gear set 16 includes a sun gear member 16A, a ring gear member 16C and a planet gear carrier member 16B that rotatably supports a set of planet gears 16D (only one of which is shown). The sun gear member 16A is connected for common rotation with the input shaft or member 12. The ring gear member 16C is connected for common rotation with a fourth shaft or interconnecting member 48. The planet carrier member 16B is connected for common rotation with the second shaft or interconnecting member 44. The planet gears 16D are each configured to intermesh with both the sun gear member 16A and the ring gear member 16C.

The planetary gear set 18 includes a sun gear member 18A, a ring gear member 18C and a planet gear carrier member 18B that rotatably supports a set of planet gears 18D (only one of which is shown). The sun gear member 18A is connected for common rotation with a fifth shaft or interconnecting member 52. The ring gear member 18C is connected for common rotation with the third shaft or interconnecting member 46 and with a sixth shaft or interconnecting member 54. The planet carrier member 18B is connected for common rotation with the fourth shaft or interconnecting member 48 and with a seventh shaft or interconnecting member 56. The planet gears 18D are each configured to intermesh with both the sun gear member 18A and the ring gear member 18C.

The planetary gear set 20 includes a sun gear member 20A, a ring gear member 20C and a planet gear carrier member 20B that rotatably supports a set of planet gears 20D (only one of which is shown). The sun gear member 20A is connected for common rotation with an eighth shaft or interconnecting member 58. The ring gear member 20C is connected for common rotation with the sixth shaft or interconnecting member 54 and with a ninth shaft or interconnecting member 60. The planet carrier member 20B is connected for common rotation with the seventh shaft or interconnecting member 56 and with a tenth shaft or interconnecting member 62. The planet gears 20D are each configured to intermesh with both the sun gear member 20A and the ring gear member 20C.

The input shaft or member 12 is continuously connected to an engine (not shown) through a turbine of a torque converter, fluid coupling, friction launch clutch or other starting device (not shown). The output shaft or member 22 is continuously connected with the final drive unit or transfer case (not shown).

The torque-transmitting mechanisms or clutches 24, 26, 28 and brakes 30, 32, 34 and 36 allow for selective interconnection of the shafts or interconnecting members, members of the planetary gear sets and the housing. The clutches 24, 26, 28 and brakes 30, 32, 34 and 36 are friction, dog or synchronizer type mechanisms or the like. For example, the first clutch 24 is selectively engageable to connect the input shaft or member 12 with the fifth shaft or interconnecting member 52. The second clutch 26 is selectively engageable to connect the input shaft or member 12 with the fourth shaft or interconnecting member 48. The third clutch 28 is selectively engageable to connect the ninth shaft or interconnecting member 60 with the tenth shaft or interconnecting member 62. The first brake 30 is selectively engageable to connect the fifth shaft or interconnecting member 52 with the stationary element or the transmission housing 50 in order to restrict the member 52 from rotating relative to the transmission housing 50. The second brake 32 is selectively engageable to connect the eighth shaft or interconnecting member 58 with the stationary element or the transmission housing 50 in order to restrict the member 58 from rotating relative to the transmission housing 50. The third brake 34 is selectively engageable to connect the tenth shaft or interconnecting member 62 with the stationary element or the transmission housing 50 in order to restrict the member 62 from rotating relative to the transmission housing 50. The fourth brake 36 is selectively engageable to connect the first shaft or interconnecting member 42 with the stationary element or the transmission housing 50 in order to restrict the member 42 from rotating relative to the transmission housing 50.

Alternatively, in another embodiment of the present invention one-way clutch or freewheeler 38 selectively connects the carrier members 18B and 20B of the third and fourth planetary gear sets 18, 20 and the ring gear 16C of the second planetary gear set 16 with the transmission housing 50. Accordingly, a first to a second gear ratio shift is achieved through the use of freewheeler 38. In the instant embodiment, the third brake 34 is applied in reverse and first gear (only for engine braking), as shown in the table of FIG. 3.

In yet another embodiment of the present invention, the third clutch 28 is selectively engageable to connect the eighth shaft or interconnecting member 58 with the tenth shaft or interconnecting member 62, instead of connecting the ninth shaft or interconnecting member 60 to the tenth shaft or interconnecting member 62, as shown in dashed lines in FIG. 2. In other words, clutch 28 is selectively engageable to connect carrier member 20B with the sun gear 20A, instead of connecting the carrier member 20B with the ring gear 20C.

Referring now to FIG. 2 and FIG. 3, the operation of the nine speed transmission 10 will be described. It will be appreciated that transmission 10 is capable of transmitting torque from the input shaft or member 12 to the output shaft or member 22 in at least nine forward speed or torque ratios and at least one reverse speed or torque ratio. Each forward and reverse speed or torque ratio is attained by engagement of two or more of the torque-transmitting mechanisms (i.e. first clutch 24, second clutch 26, third clutch 28, first brake 30, second brake 32, third brake 34 and fourth brake 36), as will be explained below. FIG. 3 is a truth table that present the various combinations of torque-transmitting mechanisms that are activated or engaged to achieve the various gear states. An "X" in the box means that the particular referenced clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

With specific reference to FIG. 3, a truth table is presented illustrating a state of engagement of the various torque transmitting elements in each of the available forward and reverse speeds or gear ratios of the transmission 10. Accordingly, a reverse gear is established through the engagement or activation of the first clutch 24 and third brake 34. The first clutch 24 connects the input shaft or member 12 with the fifth shaft or interconnecting member 52. The third brake 34 connects the tenth shaft or interconnecting member 62 with the stationary element or the transmission housing 50 in order to restrict the member 62 from rotating relative to the transmission housing 50. Likewise, the nine forward ratios are achieved through different combinations of clutch and brake engagement, as shown in FIG. 3.

Referring now to FIG. 4, a stick diagram presents a schematic layout of yet another embodiment of the nine speed transmission 10' according to the present invention. In FIG. 4, the numbering from the lever diagram of FIG. 1 and the previous embodiment of FIG. 2 is carried over. Transmission 10' has the four planetary gear sets 14, 16, 18 and 20 as described with respect to transmission 10 above. The two of the three rotating clutches 24 and 28 have been reconfigured as described below and the second clutch brake 26 remains the same as configured and described with respect to transmission 10 above. Three of the four brakes 30, 32 and 34 have been reconfigured as described below and the fourth brake 36 remains the same as configured and described with respect to transmission 10 above. Moreover, interconnecting members or shafts 42, 44, 46 and 48 are also configured and connected to the respective components of the planetary gear sets as described above with respect to transmission 10. However, transmission 10' has several distinct differences relative to transmission 10. For example, interconnecting member or shaft 52 has been eliminated and replaced with a reconfigured interconnecting member or shaft 52', interconnecting member or shaft 54 has been eliminated and replaced with a reconfigured interconnecting member or shaft 54', interconnecting member or shaft 58 has been eliminated and replaced with a reconfigured interconnecting member or shaft 58'. Reconfigured interconnecting member or shaft 52' connects the sun gear 18A of the third planetary gear set 18 to the carrier member 20B of the fourth planetary gear set 20 and to brake 32. Reconfigured interconnecting member or shaft 54' connects the carrier member 18B of the third planetary gear set 18 to the ring gear 20C of the fourth planetary gear set 20 and to brake 32. Reconfigured interconnecting member or shaft 58' connects the sun gear 20A of the fourth planetary gear set 20 to first clutch 24 and to the first brake 30. Interconnecting members or shafts 60 and 62 have been eliminated. Furthermore, the first clutch 24 has been eliminated and replaced with a reconfigured second clutch 24', the third clutch 28 has been eliminated and replaced with a reconfigured third clutch 28', the first brake 30 has been eliminated and replaced with a reconfigured first brake 30', the second brake 32 has been eliminated and replaced with a reconfigured second brake 32' and the third brake 34 has been eliminated and replaced with a reconfigured third brake 34'. Reconfigured first clutch 24' selectively connects for common rotation input shaft 12 with reconfigured interconnecting member or shaft 58'. Reconfigured third clutch 28' selectively connects for common rotation interconnecting shaft 46 and reconfigured interconnecting member or shaft 54'. Reconfigured first brake 30' selectively connects reconfigured interconnecting member or shaft 58' with the stationary element or the transmission housing 50 in order to restrict the member 58' from rotating relative to the transmission housing 50. Reconfigured second brake 32' selectively connects reconfigured interconnecting member or shaft 52' with the stationary element or the transmission housing 50 in order to restrict the member 52' from rotating relative to the transmission housing 50. Reconfigured second brake 34' selectively connects reconfigured interconnecting member or shaft 54' with the stationary element or the transmission housing 50 in order to restrict the member 54' from rotating relative to the transmission housing 50.

With specific reference to FIG. 5, a truth table is shown similar to FIG. 3 illustrating a state of engagement of the various torque transmitting elements in each of the available forward and reverse speeds or gear ratios of the transmission 10'. For example, a reverse gear is established through the engagement or activation of the first reconfigured clutch 24' and third reconfigured brake 34'. The first reconfigured clutch 24' connects the input shaft or member 12 with the reconfigured shaft or interconnecting member 58'. The third reconfigured brake 34' connects the reconfigured shaft or interconnecting member 54' with the stationary element or the transmission housing 50 in order to restrict the member 54' from rotating relative to the transmission housing 50. Likewise, the nine forward ratios are achieved through different combinations of clutch and brake engagement, as shown in FIG. 5.

It will be appreciated that the foregoing explanation of operation and gear states of the nine speed transmissions 10 and 10' assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The present invention contemplates other embodiments of a multi-speed planetary gear set transmission. For example, in yet another embodiment the third clutch 28 is eliminated to produce an eight speed planetary gear set transmission. In still another embodiment of the present invention, first brake 30 is eliminated to produce a seven speed planetary gear set transmission. Moreover, planetary gear sets 18 and 20 may be replaced with a single planetary gear set. In yet another embodiment, both the third clutch 28 and first brake 30 are eliminated to produce a six speed planetary gear set transmission.

Referring now to FIG. 6, a schematic layout of yet another embodiment of a nine speed transmission 100 according to the present invention is illustrated. In the instant embodiment, transmission 100 has four planetary gear sets 114, 116, 118 and 120 supported and enclosed by a transmission housing (not shown) having a ground or stationary member 150 attached to the housing. Planetary gear sets 114, 116 and 118 are simple planetary gear sets and planetary gear set 120 is a compound planetary gear set.

Accordingly, the simple planetary gear set 114 includes a sun gear member 114C, a ring gear member 114A and a planet gear carrier member 114B that rotatably supports a set of planet gears 114D (only one of which is shown). The sun gear member 114C is connected for common rotation with a first shaft or interconnecting member 142. The ring gear member 114A is connected for common rotation with a second shaft or interconnecting member 144. The planet carrier member 114B is connected for common rotation with a third shaft or interconnecting member 146 and an output shaft or member 122. The planet gears 114D are each configured to intermesh with both the sun gear member 114C and the ring gear member 114A.

The simple planetary gear set 116 includes a sun gear member 116A, a ring gear member 116C and a planet gear carrier member 116B that rotatably supports a set of planet gears 116D (only one of which is shown). The sun gear member 116A is connected for common rotation with an input shaft or member 112. The ring gear member 116C is connected for common rotation with a fourth shaft or interconnecting member 148. The planet carrier member 116B is connected for common rotation with the second shaft or interconnecting member 144. The planet gears 116D are each configured to intermesh with both the sun gear member 116A and the ring gear member 116C.

The simple planetary gear set 118 includes a sun gear member 118A, a ring gear member 118C and a planet gear carrier member 118B that rotatably supports a set of planet gears 118D (only one of which is shown). The sun gear member 118A is connected for common rotation with a fifth shaft or interconnecting member 152 and with a sixth shaft or interconnecting member 154. The ring gear member 118C is connected for common rotation with the third shaft or interconnecting member 146. The planet carrier member 118B is connected for common rotation with the fourth shaft or interconnecting member 148 and with a seventh shaft or interconnecting member 156. The planet gears 118D are each configured to intermesh with both the sun gear member 118A and the ring gear member 118C.

The compound planetary gear set 120 includes a sun gear member 120A, a ring gear member 120C and a planet gear carrier member 120B that rotatably supports a first set of planet gears 120D (only one of which is shown) and a second set of planet gears 120E (only one of which is shown). The sun gear member 120A is connected for common rotation with the fifth shaft or interconnecting member 152. The ring gear member 120C is connected for common rotation with an eighth shaft or interconnecting member 158. The planet carrier member 120B is connected for common rotation with the seventh shaft or interconnecting member 156 and with a ninth shaft or interconnecting member 160. The first set of planet gears 120D are each configured to intermesh with both the sun gear member 120A and the second set of planet gears 120E. The second set of planet gears 120E are each configured to intermesh with both the ring gear member 120C and the first set of planet gears 120D.

The input shaft or member 112 is continuously connected to an engine (not shown) through a turbine of a torque converter, fluid coupling, friction launch clutch or other starting device (not shown). The output shaft or member 122 is continuously connected with the final drive unit or transfer case (not shown).

Transmission 100 further includes a plurality of torque-transmitting mechanisms or clutches 124, 126, 128 and brakes 130, 132, 134 and 136 that allow for selective interconnection of the shafts or interconnecting members, members of the planetary gear sets and the housing. The clutches 124, 126, 128 and brakes 130, 132, 134 and 136 are friction, dog or synchronizer type mechanisms or the like. For example, the first clutch 124 is selectively engageable to connect the input shaft or member 112 with the sixth shaft or interconnecting member 154. The second clutch 126 is selectively engageable to connect the input shaft or member 112 with the fourth shaft or interconnecting member 148. The third clutch 128 is selectively engageable to connect the third shaft or interconnecting member 146 with the seventh shaft or interconnecting member 156. The first brake 130 is selectively engageable to connect the sixth shaft or interconnecting member 154 with the stationary member or the transmission housing 150 in order to restrict the member 154 from rotating relative to the transmission housing 150. The second brake 132 is selectively engageable to connect the ninth shaft or interconnecting member 160 with the stationary member or the transmission housing 150 in order to restrict the member 160 from rotating relative to the transmission housing 150. The third brake 134 is selectively engageable to connect the eighth shaft or interconnecting member 158 with the stationary element or the transmission housing 150 in order to restrict the member 158 from rotating relative to the transmission housing 150. The fourth brake 136 is selectively engageable to connect the first shaft or interconnecting member 142 with the stationary member or the transmission housing 150 in order to restrict the member 142 from rotating relative to the transmission housing 150.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
   an input member;
   an output member;
   first, second, third and fourth planetary gear sets each having first, second and third members;
   a plurality of interconnecting members each connecting one of the first, second, and third members of one of the planetary gear sets directly with another one of the first members, second members, and third members of another one of the planetary gear sets, and seven torque transmitting devices each selectively engageable to interconnect one of the first, second, and third members of one of the planetary gear sets directly with another one of the first members, second members, third members of one of the planetary gear sets, a stationary member, or the input member;

wherein the torque transmitting devices are selectively engageable in combinations of at least two to establish a plurality of forward speed ratios and at least one reverse speed ratio between the input member and the output member, a first of the seven torque transmitting devices is selectively engageable to interconnect the first member of the third planetary gear set directly to the first member of the second planetary gear set, and a second of the seven torque transmitting devices is selectively engageable to interconnect the third member of the second planetary gear set and the second member of the third planetary gear set directly to the first member of the second planetary gear set.

2. The transmission of claim 1 wherein the input member is continuously interconnected directly to the first member of the second planetary gear sets and the output member is continuously interconnected directly to the second member of the first planetary gear set and the third member of the third planetary gear set.

3. The transmission of claim 2 wherein the third member of the first planetary gear set, the first member of the second planetary gear set, the first member of the third planetary gear set, and the first member of the fourth planetary gear set are sun gears, the second member of the first planetary gear set, the second member of the second planetary gear set, the second member of the third planetary gear set, and the second member of the fourth planetary gear set are carrier members, and the first member of the first planetary gear set, the third member of the second planetary gear set, the third member of the third planetary gear set, and the third member of the fourth planetary gear set are ring gears.

4. The transmission of claim 3 wherein the carrier member of the fourth planetary gear set rotatably supports a first and second set of planet pinion gears, the first set of planet pinion gears mesh with the sun gear and the second set of planet pinion gears, and the second set of planet pinion gears mesh with the ring gear and the first set of planet pinion gears.

5. The transmission of claim 1 wherein a first of the plurality of interconnecting members continuously interconnects the first member of the first planetary gear set directly with the second member of the second planetary gear set.

6. The transmission of claim 5 wherein a second of the plurality of interconnecting members continuously interconnects the second member of the first planetary gear set directly with the third member of the third planetary gear set.

7. The transmission of claim 6 wherein a third of the plurality of interconnecting members continuously interconnects the third member of the second planetary gear set directly with the second member of the third planetary gear set.

8. The transmission of claim 7 wherein a fourth of the plurality of interconnecting members continuously interconnects the second member of the third planetary gear set directly with the third member of the fourth planetary gear set.

9. The transmission of claim 8 wherein a fifth of the plurality of interconnecting members continuously interconnects the first member of the third planetary gear set directly with the second member of the fourth planetary gear set.

10. The transmission of claim 7 wherein a fourth of the plurality of interconnecting members continuously interconnects the second member of the third planetary gear set directly with the second member of the fourth planetary gear set.

11. The transmission of claim 10 wherein a fifth of the plurality of interconnecting members continuously interconnects the third member of the third planetary gear set directly with the third member of the fourth planetary gear set.

12. The transmission of claim 10 wherein a fifth of the plurality of interconnecting members continuously interconnects the first member of the third planetary gear set directly with the first member of the fourth planetary gear set.

13. The transmission of claim 1 wherein a third of the seven torque transmitting devices is selectively engageable to interconnect the first member of the third planetary gear set directly to the stationary member.

14. The transmission of claim 13 wherein a fourth of the seven torque transmitting devices is selectively engageable to interconnect the second member of the third planetary gear set directly to the stationary member.

15. The transmission of claim 14 wherein a fifth of the seven torque transmitting devices is selectively engageable to interconnect the third member of the first planetary gear set directly to the stationary member.

16. The transmission of claim 15 wherein a sixth of the seven torque transmitting devices is selectively engageable to interconnect the first member of the fourth planetary gear set directly to the stationary member.

17. The transmission of claim 16 wherein a seventh of the seven torque transmitting devices is selectively engageable to interconnect the third member of the fourth planetary gear set directly to the second member of the fourth planetary gear set.

18. The transmission of claim 15 wherein a sixth of the seven torque transmitting devices is selectively engageable to interconnect the third member of the fourth planetary gear set directly to the stationary member.

19. The transmission of claim 18 wherein a seventh of the seven torque transmitting devices is selectively engageable to interconnect the second member of the fourth planetary gear set directly to the third member of the fourth planetary gear set and the second member of the first planetary gear set.

20. A transmission comprising:
an input member;
an output member;
first, second, third and fourth planetary gear sets each having first, second and third members, wherein the input member is continuously interconnected directly to the first member of the second planetary gear sets and the output member is continuously interconnected directly to the second member of the first planetary gear set and the third member of the third planetary gear set;
a plurality of interconnecting members each connecting one of the first, second, and third members of one of the planetary gear sets directly with another one of the first members, second members, and third members of another one of the planetary gear sets, wherein a first of the plurality of interconnecting members continuously interconnects the first member of the first planetary gear set directly with the second member of the second planetary gear set, a second of the plurality of interconnecting members continuously interconnects the second member of the first planetary gear set directly with the third member of the third planetary gear set, a third of the plurality of interconnecting members continuously interconnects the third member of the second planetary gear set directly with the second member of the third planetary gear set, and a plurality of torque transmitting devices each selectively engageable to interconnect one of the first, second, and third members of one of the planetary gear sets directly with another one of the first members, second members, third members of one of the planetary gear sets, a stationary member, or the input member; and wherein the torque transmitting devices are selectively engageable in combinations of at least two to establish a plurality of forward speed ratios and at least one reverse speed ratio between the input member and the output member.

21. The transmission of claim 20 wherein a fourth of the plurality of interconnecting members continuously interconnects the second member of the third planetary gear set directly with the third member of the fourth planetary gear set.

22. The transmission of claim 21 wherein a fifth of the plurality of interconnecting members continuously interconnects the first member of the third planetary gear set directly with the second member of the fourth planetary gear set.

23. The transmission of claim 20 wherein the third member of the first planetary gear set, the first member of the second planetary gear set, the first member of the third planetary gear set, and the first member of the fourth planetary gear set are sun gears, the second member of the first planetary gear set, the second member of the second planetary gear set, the second member of the third planetary gear set, and the second member of the fourth planetary gear set are carrier members, and the first member of the first planetary gear set, the third member of the second planetary gear set, the third member of the third planetary gear set, and the third member of the fourth planetary gear set are ring gears.

24. The transmission of claim 23 wherein the carrier member of the fourth planetary gear set rotatably supports a first and second set of planet pinion gears, the first set of planet pinion gears mesh with the sun gear and the second set of planet pinion gears, and the second set of planet pinion gears mesh with the ring gear and the first set of planet pinion gears.

25. The transmission of claim 20 wherein a fourth of the plurality of interconnecting members continuously interconnects the second member of the third planetary gear set directly with the second member of the fourth planetary gear set.

26. The transmission of claim 25 wherein a fifth of the plurality of interconnecting members continuously interconnects the third member of the third planetary gear set directly with the third member of the fourth planetary gear set.

27. The transmission of claim 25 wherein a fifth of the plurality of interconnecting members continuously interconnects the first member of the third planetary gear set directly with the first member of the fourth planetary gear set.

28. The transmission of claim 20 wherein a first of the plurality of torque transmitting devices is selectively engageable to interconnect the first member of the third planetary gear set directly to the first member of the second planetary gear set, a second of the plurality of torque transmitting devices is selectively engageable to interconnect the third member of the second planetary gear set and the second member of the third planetary gear set directly to the first member of the second planetary gear set, a third of the plurality of torque transmitting devices is selectively engageable to interconnect the first member of the third planetary gear set directly to the stationary member, a fourth of the plurality of torque transmitting devices is selectively engageable to interconnect the second member of the third planetary gear set directly to the stationary member, and a fifth of the plurality of torque transmitting devices is selectively engageable to interconnect the third member of the first planetary gear set directly to the stationary member.

29. The transmission of claim 28 wherein a sixth of the plurality of torque transmitting devices is selectively engageable to interconnect the first member of the fourth planetary gear set directly to the stationary member.

30. The transmission of claim 28 wherein a sixth of the plurality of torque transmitting devices is selectively engageable to interconnect the third member of the fourth planetary gear set directly to the stationary member.

31. A transmission comprising:
an input member;
an output member;
first, second, third and fourth planetary gear sets each having first, second and third members, wherein the input member is continuously interconnected directly to the first member of the second planetary gear sets and the output member is continuously interconnected directly to the second member of the first planetary gear set and the third member of the third planetary gear set;

a plurality of interconnecting members each connecting one of the first, second, and third members of one of the planetary gear sets directly with another one of the first members, second members, and third members of another one of the planetary gear sets, and a plurality of torque transmitting devices each selectively engageable to interconnect one of the first, second, and third members of one of the planetary gear sets directly with another one of the first members, second members, third members of one of the planetary gear sets, a stationary member, or the input member, wherein a first of the plurality of torque transmitting devices is selectively engageable to interconnect the first member of the third planetary gear set directly to the first member of the second planetary gear set, a second of the plurality of torque transmitting devices is selectively engageable to interconnect the third member of the second planetary gear set and the second member of the third planetary gear set directly to the first member of the second planetary gear set, a third of the plurality of torque transmitting devices is selectively engageable to interconnect the first member of the third planetary gear set directly to the stationary member, a fourth of the plurality of torque transmitting devices is selectively engageable to interconnect the second member of the third planetary gear set directly to the stationary member, and a fifth of the plurality of torque transmitting devices is selectively engageable to interconnect the third member of the first planetary gear set directly to the stationary member; and wherein the torque transmitting devices are selectively engageable in combinations of at least two to establish a plurality of forward speed ratios and at least one reverse speed ratio between the input member and the output member.

32. The transmission of claim 31 wherein a sixth of the plurality of torque transmitting devices is selectively engageable to interconnect the third member of the fourth planetary gear set directly to the stationary member.

33. The transmission of claim 32 wherein a seventh of the seven torque transmitting devices is selectively engageable to interconnect the second member of the fourth planetary gear set directly to the third member of the fourth planetary gear set and the second member of the first planetary gear set.

34. The transmission of claim 31 wherein a sixth of the plurality of torque transmitting devices is selectively engageable to interconnect the first member of the fourth planetary gear set directly to the stationary member.

35. The transmission of claim 34 wherein a seventh of the seven torque transmitting devices is selectively engageable to interconnect the third member of the fourth planetary gear set directly to the second member of the fourth planetary gear set.

36. The transmission of claim 31 wherein the third member of the first planetary gear set, the first member of the second planetary gear set, the first member of the third planetary gear set, and the first member of the fourth planetary gear set are sun gears, the second member of the first planetary gear set, the second member of the second planetary gear set, the second member of the third planetary gear set, and the second member of the fourth planetary gear set are carrier members, and the first member of the first planetary gear set, the third member of the second planetary gear set, the third member of the third planetary gear set, and the third member of the fourth planetary gear set are ring gears.

37. The transmission of claim 36 wherein the carrier member of the fourth planetary gear set rotatably supports a first and second set of planet pinion gears, the first set of planet pinion gears mesh with the sun gear and the second set of planet pinion gears, and the second set of planet pinion gears mesh with the ring gear and the first set of planet pinion gears.

38. The transmission of claim 31 wherein a first of the plurality of interconnecting members continuously interconnects the first member of the first planetary gear set directly with the second member of the second planetary gear set, a second of the plurality of interconnecting members continuously interconnects the second member of the first planetary gear set directly with the third member of the third planetary gear set, and a third of the plurality of interconnecting members continuously interconnects the third member of the second planetary gear set directly with the second member of the third planetary gear set.

39. The transmission of claim 38 wherein a fourth of the plurality of interconnecting members continuously interconnects the second member of the third planetary gear set directly with the third member of the fourth planetary gear set.

40. The transmission of claim 39 wherein a fifth of the plurality of interconnecting members continuously interconnects the first member of the third planetary gear set directly with the second member of the fourth planetary gear set.

41. The transmission of claim 38 wherein a fourth of the plurality of interconnecting members continuously interconnects the second member of the third planetary gear set directly with the second member of the fourth planetary gear set.

42. The transmission of claim 41 wherein a fifth of the plurality of interconnecting members continuously interconnects the third member of the third planetary gear set directly with the third member of the fourth planetary gear set.

43. The transmission of claim 41 wherein a fifth of the plurality of interconnecting members continuously interconnects the first member of the third planetary gear set directly with the first member of the fourth planetary gear set.

* * * * *